United States Patent [19]

Duminy

[11] Patent Number: 4,586,594

[45] Date of Patent: May 6, 1986

[54] CLUTCH ASSEMBLY CAPABLE OF BEING ENGAGED BY FLUID PRESSURE DEPENDING ON CENTRIFUGAL FORCE

[75] Inventor: Jacques Duminy, Crailsheim, Fed. Rep. of Germany

[73] Assignee: Voith Turbo GmbH & Co. KG, Crailsheim, Fed. Rep. of Germany

[21] Appl. No.: 459,536

[22] PCT Filed: Apr. 2, 1982

[86] PCT No.: PCT/EP82/00077

§ 371 Date: Jan. 12, 1983

§ 102(e) Date: Jan. 12, 1983

[87] PCT Pub. No.: WO82/04107

PCT Pub. Date: Nov. 25, 1982

[30] Foreign Application Priority Data

May 14, 1981 [DE] Fed. Rep. of Germany ....... 3119171

[51] Int. Cl.$^4$ ............................................. F16D 25/06
[52] U.S. Cl. .............................. 192/103 FA; 192/3.31; 192/85 F; 192/105 F
[58] Field of Search .................. 192/3.29, 3.31, 85 A, 192/85 AA, 85 F, 103 A, 103 FA, 105 A, 105 F

[56] References Cited

U.S. PATENT DOCUMENTS

| | | |
|---|---|---|
| 2,210,416 | 8/1940 | Kiep et al. ...................... 192/85 AA |
| 2,452,008 | 10/1948 | Wickwire et al. ............... 192/105 A |
| 2,555,772 | 6/1951 | Wickwire ....................... 192/105 A |
| 2,771,976 | 11/1956 | Smirl ............................... 192/85 AA |
| 3,004,559 | 10/1961 | Warman, Jr. ................... 192/88 A X |
| 3,157,057 | 11/1964 | Palmer et al. .................. 192/88 A X |
| 3,176,813 | 4/1965 | Lee et al. ....................... 192/85 AA |
| 3,527,329 | 9/1970 | Jordan ............................. 192/88 A |
| 3,819,020 | 6/1974 | Smith ............................. 192/103 FA |
| 3,862,678 | 1/1975 | Collins ............................ 192/88 A |
| 3,926,288 | 12/1975 | Nerstad ........................... 192/105 A X |
| 4,004,670 | 1/1977 | Nerstad et al. ................. 192/105 A |
| 4,083,442 | 4/1978 | Ushijima ........................ 192/85 AA X |
| 4,238,020 | 12/1980 | Nerstad et al. ................. 192/103 FA |
| 4,295,633 | 10/1981 | Sigmon .......................... 192/88 A X |
| 4,308,940 | 1/1982 | Cadee ............................. 192/103 FA |

FOREIGN PATENT DOCUMENTS

| | | |
|---|---|---|
| 89363 | 4/1896 | Fed. Rep. of Germany . |
| 1975540 | 3/1944 | Fed. Rep. of Germany . |
| 623003 | 5/1949 | United Kingdom . |
| 627487 | 8/1949 | United Kingdom . |
| 971639 | 9/1964 | United Kingdom . |

*Primary Examiner*—Rodney H. Bonck
*Assistant Examiner*—James J. Merek
*Attorney, Agent, or Firm*—Lon H. Romanski

[57] ABSTRACT

A clutch assembly is preferably designed as a multiple-disc clutch. Rotating with one clutch half (22) is a clutch-engaging piston (26) and a pressure chamber (25) into which fluid may be admitted. Against the force of a spring (29), the piston may be subjected to the fluid pressure which is generated in the pressure chamber (25) and which is dependent upon the rotational speed. Arranged beside the pressure chamber is a fluid reservoir chamber (37), communicating with the pressure chamber (25) via connecting conduits (44, 45). With the aid of a control element (48) the filling of the pressure chamber (25) with fluid from the reservoir chamber (37) is controlled during a start-up process. In this manner, the engagement of the clutch assembly is controlled. Thereby delivery of fluid from outside of the clutch assembly is unnecessary. Further, the following may be provided for:

A portion of the reservoir chamber (37) is arranged at a greater distance from the rotational axis of the clutch assembly than the outermost region of the pressure chamber (25). The latter communicates via an outlet opening (45) controlled by control element (48) with the reservoir chamber. The control element (48) is a control valve, actuated by centrifugal force. A stationary scoop tube (39) delivers fluid from the radially outer region of the reservoir chamber to the radially inner region of the pressure chamber (25).

11 Claims, 4 Drawing Figures

CLUTCH ASSEMBLY CAPABLE OF BEING ENGAGED BY FLUID PRESSURE DEPENDING ON CENTRIFUGAL FORCE

TECHNICAL FIELD

This invention relates to a clutch assembly capable of being engaged by fluid pressure depending on centrifugal force, in particular according to the preamble of claim 1. Such a clutch assembly is preferably arrange between a driving motor and a machine to be driven. It is open at rest or when the driving motor is being started so that the start-up process occurs substantially free of load, and the driving motor is thereby relieved. When a preselected speed has been attained, the clutch assembly automatically becomes engaged. This preferably occurs without any control command being transmitted from outside to the clutch assembly. When needed, the clutch assembly may be combined with a hydrodynamic coupling or a hydrodynamic torque converter. This is expedient, above all, in those situations wherein the machine to be driven constitutes a large mass. In such cases, it is preferred that the power transmission, during the start-up process, be strictly hydrodynamic. The clutch assembly becomes engaged only upon termination of the start-up process. Thereby, the primary portion and the secondary portion of the hydrodynamic unit are connected to each other, thus ensuring operation without slip, which generally appears in hydrodynamic units.

BACKGROUND ART

1. U.S. Pat. No. 2,210,416
2. German Pat. No. 89 363
3. German Utility Model No. 1 975 540
4. U.S. Pat. No. 4,238,020

Document 1 discloses clutch assemblies each of which having the features mentioned in the preamble of claim 1. There, the reservoir chamber has a larger inside diameter than the pressure chamber. Upon rotation, the fluid forms a torus of fluid in the reservoir chamber and is delivered into the pressure chamber by a non-rotating scoop tube. Located in the radially outer region of the pressure chamber is a outlet opening; therethrough the fluid may return into the reservoir chamber. The quantity of returning fluid is always smaller than the delivery of the scoop tube. Thus, the pressure chamber is filled with fluid, as long as the scoop tube delivers fluid.

A problem exists with these known clutch assemblies in that they do not remain open long enough during the start-up process, because the scoop tube already fills the pressure chamber at an early time. Therefore, in FIG. 1 of Document 1, the following has been provided for: the scoop tube may be shifted axially from the exterior, whereby the outlet opening of the scoop tube may be closed. Thus, the moment when the clutch assembly is closed may be determined arbitrarily. However, additional devices allowing an intervention from the exterior are necessary. A further disadvantage resides in the following: as long as the scoop tube dips into the rotating torus of fluid and as long as it cannot yet deliver fluid because its outlet opening is closed, a relatively high loss of torque is caused.

The latter also applies to the embodiment as per FIG. 5 of Document 1. There, a valve is arranged at the outlet opening of the scoop tube, the valve initially being kept closed by the force of a spring. It opens only when, upon the attainment of a preselected speed, a sufficiently high fluid pressure has built up in the scoop tube. Thus, in that case, no intervention from the exterior is necessary to keep the clutch assembly open for a sufficiently long time. However, there again exists the disadvantage that the scoop tube causes a loss of torque for a certain time.

In FIGS. 2 to 4 of said document 1, there is shown an embodiment which attempts to overcome the noted disadvantage. For this purpose, however, the scoop tube must be swingably mounted in such a way that its scoop opening is out of the torus of fluid during the start-up process. Furthermore, a lug 96 must be arranged on the scoop tube, which lug always dips into the torus of fluid in order to swing the scoop tube into its operating position when a preselected rotational speed has been attained. A disadvantage of this mode of construction exists in that it is complicated and susceptible to trouble and that, also in this case, a loss of torque is caused.

An additional demand frequently made on clutches of this type consists in the following: If the clutch assembly rotates in closed condition and the speed falls again for some reason, it is required that the clutch assembly be quickly opened (disengaged). With the known clutch assemblies of said document 1, automatic quick opening is not possible. Only the clutch assembly of said FIG. 1 can be made to open quickly; however, this requires a mechanical adjustment from the exterior against the pressure of the fluid in the pressure chamber (page 2, right-hand column, lines 43-50).

Document 2 discloses a clutch assembly wherein the reservoir chamber is arranged in a zone which is located closer to the rotational axis of the clutch than the pressure chamber. A variably adjustable throttle valve is provided for interconnecting both chambers. In this case, a scoop tube is not required because the fluid flow from the reservoir chamber to the pressure chamber is caused by virtue of centrifugal force. However, a major disadvantage is that when the clutch assembly is at rest, the pressure chamber can never be completely emptied. Consequently, it is to be expected that the clutch assembly, during a start-up process, generally closes much too early. This is true even in consideration of the fact that it takes a certain time at the beginning of the start-up process until the fluid contents of the pressure chamber have reached the rotational speed of the clutch half which encloses the pressure chamber. A further disadvantage is that a pressure force dependent on the rotational speed is exercised on the axially movable actuator also from the fluid reservoir. Thereby, the tendency to premature closing of the clutch assembly is further intensified.

Document 3 discloses a clutch assembly which serves for bridging a hydrodynamic coupling. There, the clutch assembly is enveloped by a shell or housing which rotates with one half of the clutch assembly. The shell is provided with an aperture concentric with the rotational axis of the clutch assembly. Located in the interior of the shell is the piston which rotates with said one half of the clutch assembly and is guided to be axially movable. The space located between the shell and the piston constitutes the pressure chamber which receives the actuating fluid. When the shell is rotating, a centrifugally induced pressure develops, which is dependent upon the rotational speed. This pressure again acts upon the piston, which hereby engages the clutch assembly against the force of a spring.

A conduit having a control valve extends from outside of the clutch assembly and through the said central aperture of the shell for filling the said pressure chamber. A quick drain valve is provided in the radially outer region of the shell to permit the draining of the pressure chamber in order to achieve clutch disengagement. A disadvantage of that known clutch assembly is that the fluid flowing out of the quick drain valve must be caught outside of the clutch assembly and must again (usually by a pump) be returned to the said pressure chamber. Further, the engaging and disengaging of the clutch assembly can be actuated only by an external control command, namely by actuation of the said control valve.

DISCLOSURE OF INVENTION

The invention is based on the problem of designing a clutch assembly having the features mentioned in the preamble of claim 1 in such a way that closing (engaging) of the clutch assembly during a start-up process may be delayed sufficiently without any intervention from the outside (e.g. without transmission of an external command) and that simultaneously the occurrence of a loss of torque is avoided as far as possible.

Two different ways have been found to solve this problem (FIGS. 1 and 4).

Re FIG. 1

With this solution, a scoop tube is not required at all, so that, from this point of view, no loss of torque occurs. This is achieved by the use of a reservoir located in the area near the axis. This reservoir, however, diverging from Document 2, is fully separated from the actuator (the piston movable in axial direction) so that, from that point of view, a premature closing of the clutch assembly is not triggered. Through the arrangement of the reservoir near the axis, there is, however, no longer (as in Document 1) the possibility of the pressure chamber being emptied through a radially external opening upon a drop in rotational speed. This is, however, a further important prerequisite for the clutch assembly not to close too early during the next start-up process.

It is, therefore, now ensured in another way, namely through the designing of the pressure chamber shown in FIG. 1 (which is generally known in the case of cylinder piston units) that the pressure chamber is extensively or even completely emptied when the rotational speed falls below a preselected value. Whereas, in the case of Document 1, the fluid can already flow out of the pressure chamber by virtue of the effect of the residual centrifugal force, with the mode of construction as per FIG. 1, it is forced into the reservoir by the piston alone, which runs into its position of rest by virtue of the restoring force. In the next start-up process there is thus initially at the most a small quantity of fluid in the pressure chamber, so that the clutch assembly at first remains open. It is only when the pressure chamber again fills with fluid with a certain delay, that the area of the piston subjected to (centrifugal-force-dependent) fluid pressure is sufficiently large to overcome the restoring force and to close the clutch assembly.

By means of the discharge conduit shown in FIG. 3, a particularly rapid emptying of the pressure chamber is ensured and it is at the same time avoided that a premature filling of the pressure chamber takes place through this conduit during start-up. The same effect can be achieved by the features of claim 3. By means of the control valve arranged in the filling conduit as shown in FIG. 3, it can be achieved that the time delay in the filling of the pressure chamber can be set at will and, if required, subsequently changed.

Re FIG. 4

Retained in this solution are—for the purpose of the complete emptying of the pressure chamber upon a speed drop—the arrangement of the reservoir chamber in the radially outer region and the outlet opening located there at the pressure chamber. Now, however, (diverging from Document 1, FIGS. 1 and 5) it is ensured that the rigid scoop tube has an outlet which is always open. For it has been recognized that a scoop tube with its scoop opening submersed in the rotating torus of fluid generates a much lower loss of torque when its outlet is not blocked by a valve or the like. However, another measure now had to be taken to delay the filling of the pressure chamber during start-up: the control valve shown in FIG. 5 serves this purpose. During emptying and especially during start-up, it keeps the outlet opening located externally at the pressure chamber open during the delay time (which outlet opening has a large cross sectional area of flow) so that, at the beginning, the entire quantity of fluid fed from the scoop tube immediately flows away again. The pressure chamber does not fill until the control valve closes the outlet opening when a preselected rotational speed is reached.

From Document 4 a clutch assembly is known which has a pressure chamber being provided with an outlet opening located in the radially outer portion of the pressure chamber, which outlet opening may be regulated by means of a control valve actuated by centrifugal force. There, however, a quite different intention is aimed at than with the clutch assembly according to the invention. That is, the control valve opens only at overspeed, in order to thereby drain the pressure chamber and to open the clutch assembly. In the range between standstill and normal rotational speed, the control valve is always closed. Incidentally, the supply of fluid to the pressure chamber can only be regulated from the outside.

MODES OF CARRYING OUT THE INVENTION

Figure 1:
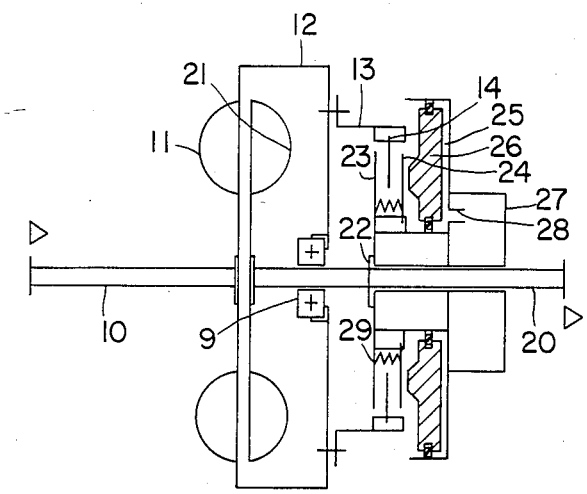
FIG. 1 shows, schematically in a longitudinal section, a hydrodynamic coupling having a bridging clutch which is designed as a clutch assembly according to this invention.

The hydrodynamic clutch assembly shown in FIG. 1 comprises a primary shaft 10 with a primary bladed wheel 11, and associated thereto, a shell 12, further a secondary shaft 20 and a secondary bladed wheel 21. The shell 12 is supported on the secondary shaft 20 by means of an antifriction bearing 9.

Provided, furthermore, is a clutch coupling body 22 being secured to the secondary shaft 20 and comprising two inner coupling plates of which the first is a rigid coupling plate 23 and the second an axially movable coupling plate 24, further, a toroidal cylindrical pressure chamber 25 containing an annular piston 26, movable axially for the actuation of the clutch assembly. Finally attached to the clutch coupling body 22 is a reservoir chamber 27 the inside diameter of which is considerably smaller than that of the pressure chamber 25. The reservoir chamber 27 is connected to the pressure chamber 25 by means of one (or more) throttled connecting conduit(s) 28. The chambers 25 and 27 are partially filled with a fluid.

At rest, compression springs 29 hold the clutch assembly open. The rotation of the secondary shaft 20 results—upon rotation of the fluid—in the development of a fluid pressure being dependent on the rotational speed. This produces an overflow of the fluid from the reservoir chamber 27 into the pressure chamber 25, with a certain time lag due to the throttling effect of the connecting conduit 28. The fluid pressure increases in the pressure chamber because here the fluid rotates at a greater distance from the rotational axis. When the rotational speed has increased sufficiently and when, accordingly, the pressure force acting on the piston 26 overcomes the restoring force of the compression springs 29, the piston 26 closes the clutch assembly. If the rotational speed again falls below a preselected value, the clutch opens again under the force of the springs 29, with the fluid being forced back into the reservoir chamber.

In the embodiment of FIG. 1, the one half (22 to 29) of the clutch assembly is connected to the machine to be driven. In this case, the other clutch half (13, 14) is connected to the driving motor. There are, however, also applications of the clutch assembly according to the invention wherein no hydrodynamic coupling is present. In those applications, the one half (22 to 29) of the clutch assembly would be connected to the driving motor while the other half (13, 14) would be connected to the machine to be driven.

Figure 2:
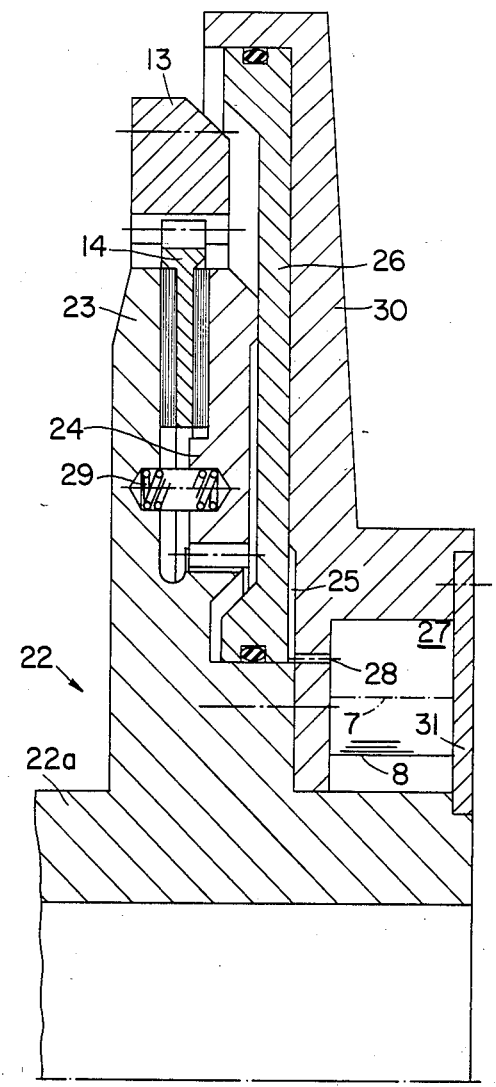
FIG. 2 shows a fragmentary longitudinal section of the clutch assembly illustrated in FIG. 1 on a larger scale as compared with FIG. 1.

FIG. 2 illustrates one possible constructional form of the clutch assembly of FIG. 1 according to the invention. All important elements are identified with the same reference numbers as in FIG. 1. In order to facilitate fabrication of the clutch assembly, the clutch body 22 is divided into a hub portion 22a and a plate member 30 which confines the pressure chamber 25 on the one side and the reservoir chamber 27 on the other side. The reservoir chamber 27 is closed toward the outside by a cover 31. The clutch assembly is depicted in its open condition wherein the piston 26—with nearly its total (in the drawing) right-hand end face—lies close to the plate member 30, so that the fluid is almost completely returned to the reservoir chamber. Further, it may be seen that the fluid, so long as it is in the reservoir chamber 27, is nearly completely separated from the piston 26. This means that the fluid pressure which is generated in the reservoir chamber 27 at the beginning of a start-up phase can hardly (that is, only to the degree permitted by the throttling hole 28) act on the piston 26. It is only after the much higher fluid pressure is developed in the pressure chamber 25 that the clutch assembly is closed. When the clutch assembly is still open but already rotating, the fluid level within reservoir 27 may be as generally depicted at 8. However, when the clutch assembly is closed, the fluid level may be as generally depicted at 7.

Figure 3:
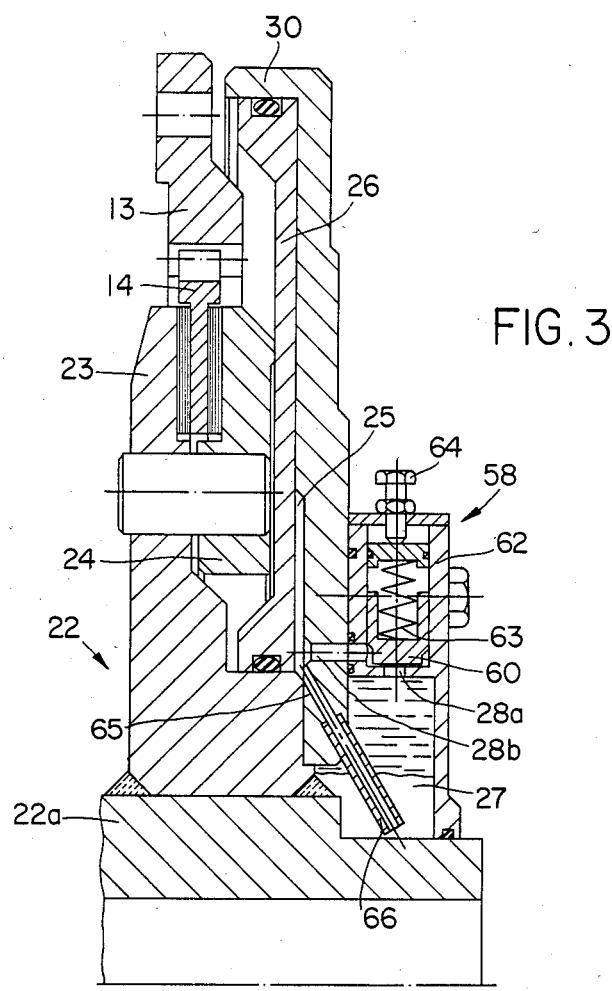
FIG. 3 shows a fragmentary longitudinal section of a clutch assembly design being modified with respect to that of FIG. 2.

In FIG. 3, too, all elements which are essentially unchanged as compared with those of FIG. 1 or 2 are identified with the same reference numbers. The compression springs 29 are not illustrated, because they lie beyond the sectional plane. The throttling hole(s) 28 has been replaced by a non-restrictive conduit 28a, 28b leading from the reservoir chamber 27 to the pressure chamber 25 and passing through control valve 58 which comprises a valve body movable in radial direction. The control valve is located in a cover body 62 which is secured to plate member 30 which at the same time surrounds the reservoir chamber 27. A spring 63 presses the valve body 60 onto a valve seat. When the centrifugal force acting upon the valve body exceeds a preselected value, the valve body 60 lifts off from its seat, thereby opening the filling conduit 28a, 28b. The force of the spring 63 may be adjusted by means of a screw 64. Additionally, a drain conduit 65 is provided which is likewise non-throttled, but in contrast to the filling conduit, non-controllable and, thus, continuously open. The drain conduit extends from the radially inner region of the pressure chamber through the plate member 30 and, with the aid of an extension tube 66, into the radially inner region of the reservoir chamber 27.

Figure 4:
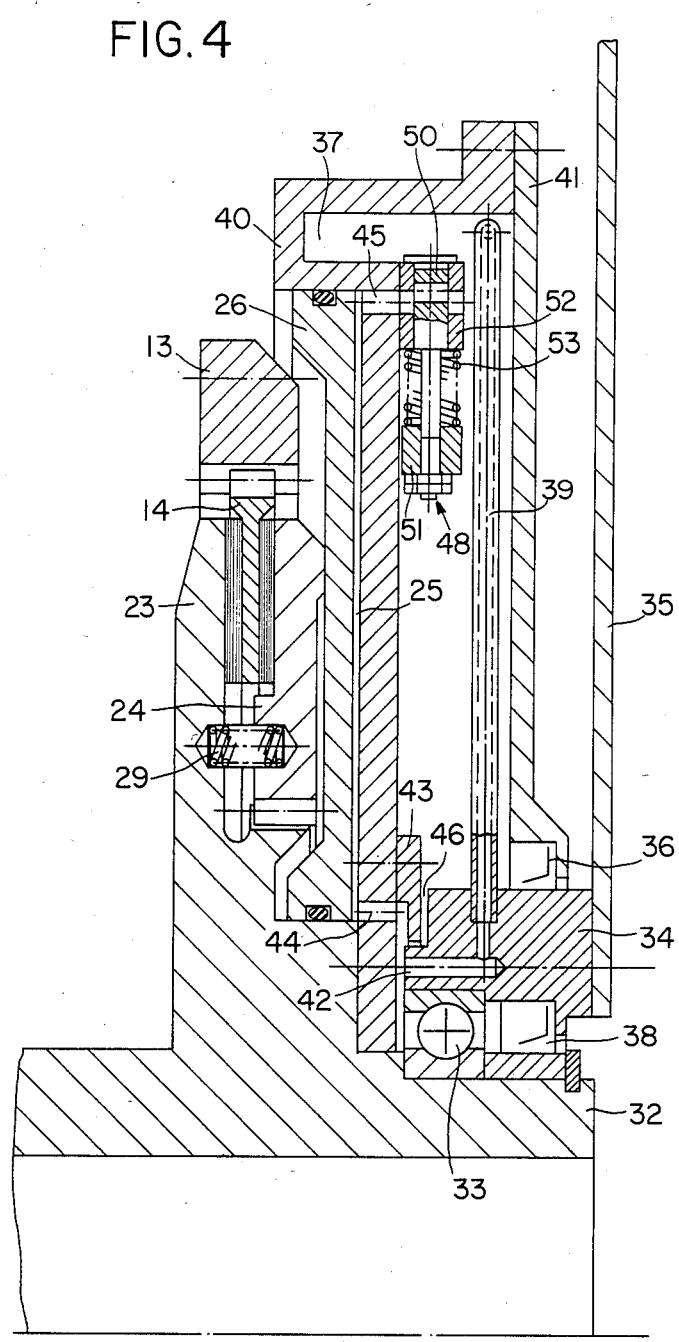
FIG. 4 shows a fragmentary longitudinal section of a further variant.

In FIG. 4, again, the elements which are unchanged as compared with those of FIG. 1 or 2 are identified with the same reference numbers. A first important difference between the modes of construction shown in FIGS. 2 and 4 consists in the following: In FIG. 4 an essential portion of the reservoir chamber 37 is located in a zone being placed more radially outwardly than is the outer periphery of the annular piston 25. Correspondingly, the plate member 40 is shaped in such a manner that it confines, together with a cover plate 41, this reservoir chamber 37 being outwardly displaced.

Further, in FIG. 4, on the clutch hub 32 is mounted a stationary ring 34 with the aid of an antifriction bearing 33. The latter must be secured, with the aid of a torque anchor member 35, to any stationary structure not shown in the drawing. Sealing rings 36 and 38 seal the reservoir chamber 37 towards the outside. In the stationary ring 34 is inserted a scoop tube 39 which extends to the outer region of the reservoir chamber 37.

Plate member 40 has, in the radially inner region of the pressure chamber 25, an inlet opening 44 and an associated catch channel 43, as well as, in the radially outer region of the pressure chamber 25, an outlet opening 45, with a control valve 48 being allocated thereto. Both openings 44 and 45 have comparatively large, non-throttled, cross-sectional flow areas. Located in the stationary ring 34 is a filling conduit 42 communicating the scoop tube 39 with the catch channel 43 and the inlet opening 44. This conduit connection is free from any overpressure (or in other words: it is pressure-relieved) by virtue of a non-sealed gap 46 provided between the stationary ring 34 and the catch channel 43.

The control valve 48 has a valve body 50 movable in radial direction, to which is fastened a flyweight 51, further a valve housing 52 fastened to the plate member 40 and a compression spring 53 tensioned between the valve housing and the flyweight 51.

As soon as the plate member 40 together with the clutch hub 32 rotates, the scoop tube 39 delivers fluid into the pressure chamber 25. However, as long as the control rotational speed is still below a preselected value, the control valve 48 remains open, so that the fluid again immediately flows out of the pressure chamber 25. Only when control rotational speed is exceeded and the control valve 48 is closed does a fluid pressure develop in the pressure chamber 25 that closes the clutch.

Now most of the fluid remains in the pressure chamber; the quantity of fluid which is still in the reservoir chamber is so small that the scoop tube 39 is only very slightly immersed in the torus of fluid; this means a further substantial reduction in the loss of torque!

FIG. 4, shows the clutch assembly in the condition in which the control valve 48 is still open and thus also the clutch assembly itself. In this condition, the piston 26 is at a certain distance from the plate member 40, so that there is a conduit connection from the inlet opening 44 to the outlet opening 45. The distance may, for example, be maintained by some ribs extending radially along the end face of the piston 26. It should again be noted that in the case of the embodiments of FIGS. 1 to 3 said distance between the piston 26 and the plate member 30 must not be present.

I claim:

1. A rotary clutch assembly, comprising two functional clutch halves, at least two cooperating friction surface means for drivingly engaging and disengaging said two functional clutch halves, actuating fluid for co-axial rotation with one of said two functional clutch halves, wherein the engaging pressure on said cooperating friction surface means is achieved by fluid pressure generated by centrifugal force exerted on said actuating fluid as said actuating fluid undergoes rotation with said one of said two functional clutch halves, said clutch assembly further comprising pressure applying actuator mans for at times applying said engaging pressure to said friction surface means as to thereby drivingly engage said two functional clutch halves to each other, said actuator means being rotatable with said one of said functional clutch halves and axially movable with respect to said one of said functional clutch halves, a pressure chamber carried by said one of said functional clutch halves and rotatable therewith, said pressure chamber being fillable with said actuating fluid, wherein upon rotation of said one of said functional clutch halves the pressure of said actuating fluid within said pressure chamber increases depending upon its centrifugal force and upon attainment of a preselected rotational speed of said one of said functional clutch halves is sufficient to cause said actuator means to move axially and achieve driving engagement of said two functional clutch halves, a reservoir chamber provided within said one of said functional clutch halves and located as to be both separate from and spaced from said pressure chamber and said actuator means, said actuating fluid being received by said reservoir chamber during periods when said two functional clutch halves are operatively disengaged from each other, fluid conduit means operatively interconnecting said pressure chamber to said reservoir chamber, said reservoir chamber being effective to receive said actuating fluid from said pressure chamber when said two functional clutch halves are operatively disengaged from each other, said reservoir chamber being located nearer to the axis of rotation of said rotary clutch assembly than is said pressure chamber, said pressure chamber comprising a continuous radially outer surface circumferentially containing said actuator means, and fluid throttling means continuously rotatable in unison with said one of said functional clutch halves and effective to control the flow of said actuating fluid from said reservoir chamber to said pressure chamber for causing said two functional clutch halves to become drivingly engaged with each other, wherein said reservoir chamber is formed as to be separated from said actuator means, wherein said pressure chamber comprises axially spaced end faces, wherein one of said axially spaced end faces is carried by said actuator means, and wherein said end faces match each other in such a way that when said two functional clutch halves are fully disengaged from each other the volume of said pressure chamber assumes nearly the value of zero.

2. A clutch assembly according to claim 1 wherein said fluid conduit means comprises a fluid supply conduit through which fluid from said reservoir chamber is supplied to said pressure chamber, wherein said fluid throttling means comprises valving means situated in series fluid circuit with said fluid supply conduit, and wherein said valving means opens and permits fluid flow from said reservoir chamber through said fluid supply conduit and to said pressure chamber when the rotational speed of said one of said functional clutch halves has exceeded a preselected rotational speed.

3. A clutch assembly according to claim 2 wherein said valving means is actuated to open by centrifugal force generated as a consequence of rotation of said one of said functional clutch halves, and wherein said centrifugal force is resisted by reset means providing a resilient reset force.

4. A clutch assembly according to claim 1 wherein said fluid throttling means comprises calibrated restriction passage means.

5. A clutch assembly according to claim 1 wherein said fluid reservoir chamber is of a generally toroidal configuration and has an inner diameter and an outer diameter, wherein said pressure applying actuator means is of ring-like configuration, wherein an axial end of said pressure applying actuator means serves to partly define said pressure chamber, wherein said axial end has an effective inner diameter and an outer diameter, wherein said inner diameter of said fluid reservoir chamber is situated radially closer to the axis or rotation of said one functional clutch half than is said inner diameter of said ring-like pressure applying actuator means, and wherein said outer diameter of said fluid reservoir chamber is situated closer to said axis of rotation than is said outer diameter of said ring-like pressure applying actuator means.

6. A rotary clutch assembly, comprising two functional clutch halves, at least two cooperating friction surface means for drivingly engaging and disengaging said two functional clutch halves, actuating fluid for co-axial rotation with one of said two functional clutch halves, wherein the engaging pressure on said cooperating friction surface means is achieved by fluid pressure generated by centrifugal force exerted on said actuating fluid as said actuating fluid undergoes rotation with said one of said two functional clutch halves, said clutch assembly further comprising pressure applying actuator means for at times applying said engaging pressure to said friction surface means as to thereby drivingly engage said two functional clutch halves to each other, said actuator means being rotatable with said one of said functional clutch halves and axially movable with respect to said one of said functional clutch halves, a pressure chamber carried by said one of said functional clutch halves and rotatable therewith, said pressure chamber being fillable with said actuating fluid, wherein upon rotation of said one of said functional clutch halves the pressure of said actuating fluid within said pressure chamber increases depending upon its centrifugal force and upon attainment of a preselected rotational speed of said one of said functional clutch halves is sufficient to cause said actuator means to move axially and achieve driving engagement of said two functional clutch halves, a reservoir chamber provided within said one of said functional clutch halves and located as to be separate from and spaced from said pressure chamber, said actuating fluid being received by said reservoir chamber during periods when said two functional clutch halves are operatively disengaged from each other, fluid conduit means operatively interconnecting said pressure chamber to said reservoir chamber, said reservoir chamber being effective to receive said actuating fluid from said pressure chamber when said two functional clutch halves are operatively disengaged from each other, said reservoir chamber being located nearer to the axis of rotation of said rotary clutch assembly than is said pressure chamber, said pressure chamber comprising a continuous radially outer surface circumferentially containing said actuator means, and fluid throttling means continuously rotatable in unison with said one of said functional clutch halves and effective to control the flow of said actuating fluid from said reservoir chamber to said pressure chamber for causing said two functional clutch halves to become drivingly engaged with each other, wherein said reservoir chamber is formed as to be separated from said actuator means, wherein said pressure chamber comprises axially spaced end faces, wherein one of said axially spaced end faces is carried by said actuator means, wherein said end faces match each other in such a way that when said two functional clutch halves are fully disengaged from each other the volume of said pressure chamber assumes nearly the value of zero, and wherein said fluid conduit means comprises drain conduit means, said drain conduit means communicating between said pressure chamber and a radially inner region of said reservoir chamber.

7. A rotary clutch assembly, comprising two functional clutch halves, at least two cooperating friction surface means for drivingly engaging and disengaging said two functional clutch halves, actuating fluid for co-axial rotation with one of said two functional clutch halves, wherein the engaging pressure on said cooperating friction surface means is achieved by fluid pressure generated by centrifugal force exerted on said actuating fluid as said actuating fluid undergoes rotation with said one of said two functional clutch halves, said clutch assembly further comprising pressure applying actuator means for at times applying said engaging pressure to said friction surface means as to thereby drivingly engage said two functional clutch halves to each other, said actuator means being rotatable with said one of said functional clutch halves and axially movable with respect to said one of said functional clutch halves, a pressure chamber carried by said one of said functional clutch halves and rotatable therewith, said pressure chamber being fillable with said actuating fluid, wherein upon rotation of said one of said functional clutch halves the pressure of said actuating fluid within said pressure chamber increases depending upon its centrifugal force and upon attainment of a preselected rotational speed of said one of said functional clutch halves is sufficient to cause said actuator means to move axially and achieve driving engagement of said two functional clutch halves, a reservoir chamber provided within said one of said functional clutch halves and located as to be separate from and spaced from said pressure chamber, said actuating fluid being received by said reservoir chamber during periods when said two functional clutch halves are operatively disengaged from each other, fluid conduit means operatively interconnecting said pressure chamber to said reservoir chamber, said reservoir chamber being effective to receive said actuating fluid from said pressure chamber when said two functional clutch halves are operatively disengaged from each other, said reservoir chamber being located nearer to the axis of rotation of said rotary clutch assembly than is said pressure chamber, said pressure chamber comprising a continuous radially outer surface circumferentially containing said actuator means, fluid throttling means continuously rotatable in unison with said one of said functional clutch halves and effective to control the flow of said actuating fluid from said reservoir chamber to said pressure chamber for causing said two functional clutch halves to become drivingly engaged with each other, wherein said reservoir chamber is formed as to be separted from said actuator means, wherein said pressure chamber comprises axially spaced end faces, wherein one of said axially spaced end faces is carried by said actuator means, wherein said end faces match each other in such a way that when said two functional clutch halves are fully disengaged from each other the volume of said pressure chamber assumes nearly the value of zero, wherein said fluid conduit means comprises drain conduit means, said drain conduit means communicating between said pressure chamber and a radially inner region of said reservoir chamber, wherein said fluid conduit means further comprises a fluid supply conduit through which fluid from said reservoir chamber is supplied to said pressure chamber, wherein said fluid throttling means comprises valving means situated in series fluid circuit with said fluid supply conduit, and wherein said valving means opens and permits fluid flow from said reservoir chamber through said fluid supply conduit and to said pressure chamber when the rotational speed of said one of said functional clutch halves has exceeded a preselected rotational speed.

8. A clutch assembly according to claim 7 wherein said valving means is actuated to open by centrifugal force generated as a consequence of rotation of said one of said functional clutch halves, and wherein said centrifugal force is resisted by reset means providing a resilient reset force.

9. A rotary clutch assembly, comprising two functional clutch halves, at least two cooperating friction surface means for drivingly engaging and disengaging said two functional clutch halves, actuating fluid for co-axial rotation with one of said two functional clutch halves, wherein the engaging pressure on said cooperating friction surface means is achieved by fluid pressure generated by centrifugal force exerted on said actuating fluid as said actuating fluid undergoes rotation with said one of said two functional clutch halves, said clutch assembly further comprising pressure applying actuator means for at times applying said engaging pressure to said friction surface means as to thereby drivingly engage said two functional clutch halves to each other, said actuator means being rotatable with said one of said functional clutch halves and axially movable with respect to said one of said functional clutch halves, a pressure chamber carried by said one of said functional clutch halves and rotatable therewith, said pressure chamber being fillable with said actuating fluid, wherein upon rotation of said one of said functional clutch halves the pressure of said actuating fluid within said pressure chamber increases depending upon its centrifugal force and upon attainment of a preselected rotational speed of said one of said functional clutch halves is sufficient to cause said actuator means to move axially and achieve driving engagement of said two functional clutch halves, a reservoir chamber provided within said one of said functional clutch halves and located as to be separate from and spaced from said pressure chamber, said actuating fluid being received by said reservoir chamber during periods when said two functional clutch halves are operatively disengaged from each other, said reservoir chamber being effective to receive said actuating fluid from said pressure chamber when said two functional clutch halves are operatively disengaged from each other, wherein said pressure chamber comprises a generally circular first outer diameter, wherein said reservoir chamber comprises a generally circular second outer diameter, wherein said second outer diameter is larger than said first outer diameter, first fluid passage means communicating between said pressure chamber and said reservoir chamber, said first fluid passage means communicating with said pressure chamber at a region thereof which is at least near said first outer diameter, a scoop-like tube situated in said reservoir chamber for transfer of said fluid from said reservoir chamber to said pressure chamber, said scoop-like tube being fixed against rotation about the axis of rotation of said one of said two functional clutch halves and fixed against movement axially with respect to said one of said two functional clutch halves, second fluid passage means communicating between said scoop-like tube and said pressure chamber, wherein said second fluid passage means is free of any control devices therein for controlling the flow of said fluid from said scoop-like tube and through said second fluid passage means, and further comprising valving means operatively carried by said one of said two functional clutch halves for rotation therewith and for at times terminating said communication through said first fluid passage means, said valving means being effective to terminate said communication through said first fluid passage means when said one of said functional clutch halves has exceeded a preselected rotational speed.

10. A clutch assembly according to claim 9 wherein said valving means is actuated to terminate said communication through said first fluid passage menans by centrifugal force generated as a consequence of rotation of said one of said functional clutch halves, and wherein said centrifugal force is resisted by reset means providing a resilient reset force.

11. A rotary clutch assembly, comprising two functional clutch halves, at least two cooperating friction surface means for drivingly engaging and disengaging said two functional clutch halves, actuating fluid for co-axial rotation with one of said two functional clutch halves, wherein the engaging pressure on said cooperating friction surface means is achieved by fluid pressure generated by centrifugal force exerted on said actuating fluid as said actuating fluid undergoes rotation with said one of said two functional clutch halves, said clutch assembly further comprising pressure applying actuator means for at times applying said engaging pressure to said friction surface means as to thereby drivingly engage said two functional clutch halves to each other, said actuator means being rotatable with said one of said functional clutch halves and axially movable with respect to said one of said functional clutch halves, a pressure chamber carried by said one of said functional clutch halves and rotatable therewith, said pressure chamber being fillable with said actuating fluid, wherein upon rotation of said one of said functional clutch halves the pressure of said actuating fluid within said pressure chamber increases depending upon its centrifugal force and upon attainment of a preselected rotational speed of said one of said functional clutch halves is sufficient to cause said actuator means to move axially and achieve driving engagement of said two functional clutch halves, a reservoir chamber provided within said one of said functional clutch halves and located as to be separate from and spaced from said pressure chamber, said actuating fluid being received by said reservoir chamber during periods when said two functional clutch halves are operatively disengaged from each other, fluid conduit means operatively interconnecting said pressure chamber to said reservoir chamber, said reservoir chamber being effective to receive said actuating fluid from said pressure chamber when said two functional clutch halves are operatively disengaged from each other, said reservoir chamber being located nearer to the axis of rotation of said rotary clutch assembly than is said pressure chamber, said pressure chamber comprising a continuous radially outer surface circumferentially containing said actuator means, and fluid throttling means continuously rotatable in unison with said one of said functional clutch halves and effective to control the flow of said actuating fluid from said reservoir chamber to said pressure chamber for causing said two functional clutch halves to become drivingly engaged with each other, wherein said reservoir chamber is formed as to be separated from said actuator means, wherein said pressure chamber comprises axially spaced end faces, wherein one of said axially spaced end faces is carried by said actuator means, wherein said end faces match each other in such a way that when said two functional clutch halves are fully disengaged from each other the volume of said pressure chamber assumes nearly the value of zero, wherein said fluid reservoir chamber is of a generally toroidal configuration and has an inner diameter and an outer diameter, wherein said pressure applying actuator means is of ring-like configuration, wherein an axial end of said pressure applying actuator means serves to partly define said pressure chamber, wherein said axial end has an effective inner diameter and an outer diameter, wherein said inner diameter of said fluid reservoir chamber is situated radially closer to the axis of rotation of said one functional clutch half than is said inner diameter of said ring-like pressure applying actuator means, wherein said outer diameter of said fluid reservoir chamber is situated closer to said axis of rotation than is said outer diameter of said ring-like pressure applying actuator means, and wherein said inner diameter of said ring-like pressure applying actuator means is situated closer to said axis of rotation than is said outer diameter of said fluid reservoir chamber.

* * * * *